Patented June 27, 1944

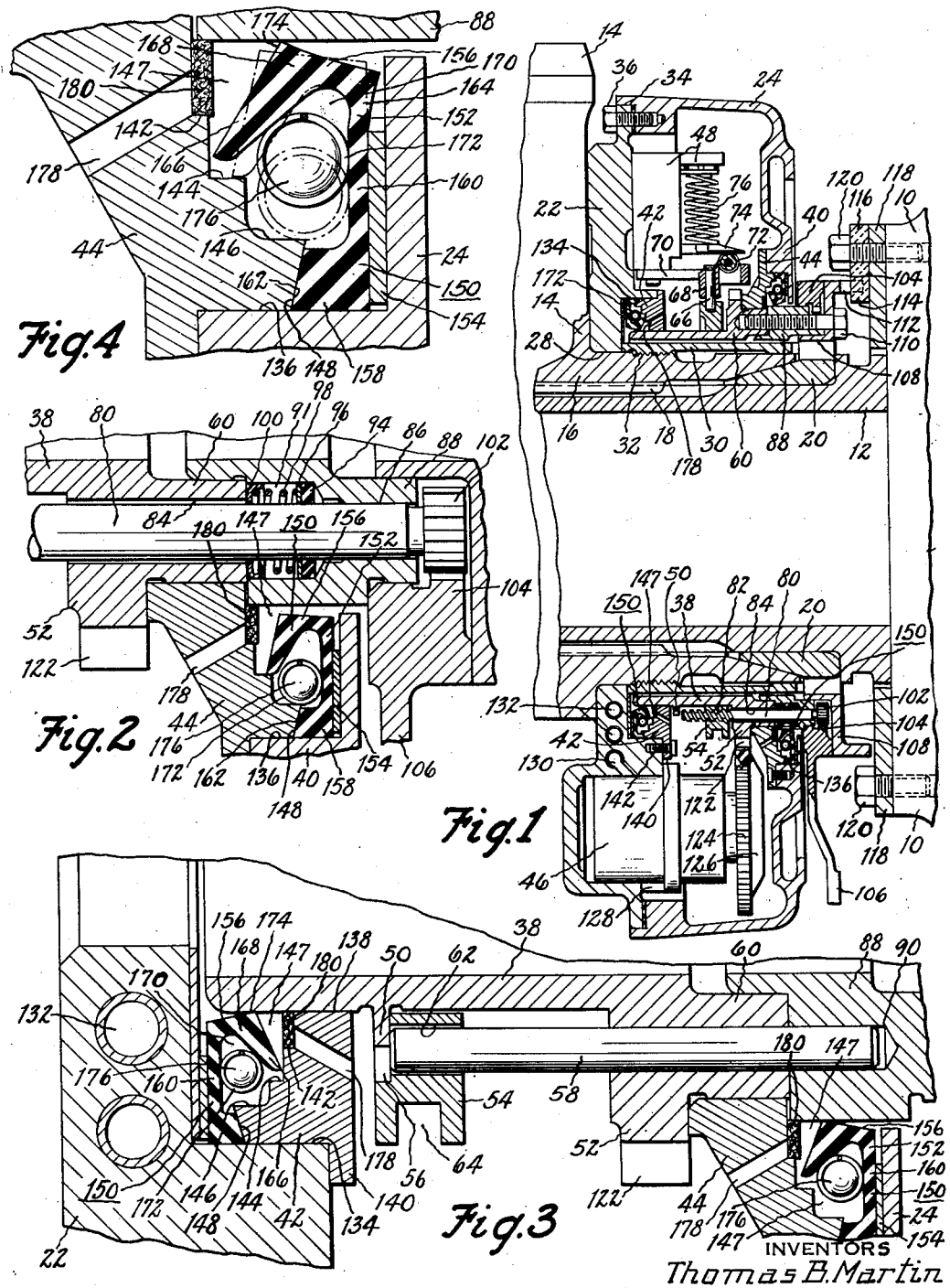

2,352,336

UNITED STATES PATENT OFFICE 2,352,336

LIFT-OFF SEAL FOR ADAPTERS AND REGULATORS

Thomas B. Martin and Kenneth L. Berninger, Dayton, Ohio, assignors to General Motors Corporation, Detroit, Mich., a corporation of Delaware Application June 24, 1942, Serial No. 448,202

16 Claims. (Cl. 170—163)

This invention relates to bearings and seals between two relatively rotating parts, and is of particular interest in the manufacture of rotating reservoirs that are closed off by a relatively fixed central sleeve member.

An object of the invention is to provide a fluid seal between a pair of relatively rotating housing members that will stop leakage of a fluid therethrough while the parts are at rest and that will reduce the surface of engagement while the parts are moving one relative to the other.

Another object is to provide a reservoir rotatable about a tubular extension with lift-off valve means at the junctures of the parts which effect a seal against leakage when subjected to liquid contact, but which under a condition of rotation lift off the extension to permit free fluid circuit past the seal while the parts are under a state of relative rotation.

A further object is to provide a reservoir for an aircraft propeller, made up of a tubular fixed part and a housing member or members rotatable around it and joined thereto by liquid seal means.

A further object is to simplify the construction and improve the efficiency of seals between relatively rotating parts.

A further object is to provide a sealing means between two relatively rotating parts that will normally stop fluid flow therebetween, but which will respond to centrifugal force to lift off and establish fluid communication therethrough.

Another object is to provide a centrifugally operated valve means for sealing a rotating reservoir while at rest, but opening communication to outside air when rotating at a predetermined speed.

A further object is to provide a unitary combination antifriction bearing and centrifugally operated valve means which will operate to effect a fluid seal against flow through the bearing at speeds below a predetermined speed of rotation, but will open to effect equalization of pressure at speeds above a predetermined speed of rotation.

A further object is to provide a centrifugally operated valve unit adapted to be disposed between radially spaced concentric relatively rotating surfaces for effecting control of fluid flow between the surfaces in response to predetermined speeds of rotation.

A still further object is to provide a relatively fixed part for a relatively rotating reservoir surrounding the same with centrifugally operated means for equalizing pressures within and without the reservoir for speeds of rotation greater than a predetermined speed.

Another object of the invention is to provide an oil seal between relatively rotating parts, with means for lifting the seal from one of the parts to eliminate wear of rubbing parts of the seal.

Among other objects, some of which will be observed as the detailed description proceeds, it is to close off one wall of a rotating annular fluid chamber by means of a relatively fixed or non-rotating tubular part projecting into the chamber to surround the drive shaft and having bearing engagement with the rotating part such that a reservoir provided thereby may be maintained throughout rotation of the chamber there being fluid seals in proximity to the bearings to stop leakage during rest of the housing and drain holes through the bearing means for return of escaped liquid to the reservoir.

Fluid actuated mechanisms used on aircraft for the control of various functions are subjected to extremes of pressure as the craft travels from the ground level to a greater altitude and descends to earth again. The systems of fluid control usually incorporate a more or less closed fluid circuit, with a chamber or reservoir for storing a reserve or supply of fluid medium on which the system depends for its satisfactory operation. If those systems are completely sealed then there is experienced great differentials of pressure between the interior and the exterior of the chamber or reservoir. Under those conditions as the craft gains altitude, there is experienced a great difference in pressure with that of the higher value on the interior of the reservoir, which gives rise to leakage and loss of the medium or else the system is placed under great strains. Either condition is hazardous, and should be overcome. The loss of fluid medium will directly affect the efficiency and operation of the control mechanism. The undue strains occurring by the unbalance of pressure may result in rupture of the fluid circuit for the control mechanism and may eventuate in the loss of the medium.

The instant invention solves the stated problems and accomplishes the objects set out and others, by providing a centrifugally operated valve means which under a condition of rest seals the reservoir against fluid flow through its walls, but upon rotation of the mechanism responds to the centrifugal force attended upon a predetermined speed of rotation for opening communication between the interior and exterior of the reservoir, so that any differential of pressure following a change of altitude may be counteracted.

In the specific embodiment shown, the reservoir is provided by a housing of annular type fixed to rotate with the propeller hub about a drive shaft extending from the engine casing. Mounted on the engine casing and fixed against rotation relative thereto is a sleeve member that projects into the housing to complete the wall structure of the housing as a reservoir or container for the fluid medium. Bearings of the journal type are interposed between the housing walls and the projecting sleeve part for supporting the sleeve. To stop leakage of fluid past the bearing means there is provided a resilient ring of rubber like material, which under a condition of rest continuously engages the extended portion of the sleeve in fluid tight relation. This resilient ring is so constructed that a thin flexible portion thereof permits a heavier part to throw out radially under centrifugal force to disengage the extended portion of the sleeve. Thus, under a state of rotation, in which the fluid medium is laying against the peripheral wall of the housing and away from the fixed sleeve portion, the resilient ring opens communication between the interior and the exterior of the reservoir allowing free fluid movement for the dissipation of any pressure differential that might otherwise occur.

Further objects and advantages of the present invention will be apparent from the following description, reference being had to the accompanying drawing wherein a preferred embodiment of the present invention is clearly shown.

In the drawing:

Fig. 1 is a fragmentary view partly in elevation and partly in section illustrating the instant invention.

Fig. 2 is an enlarged sectional view illustrating the contributing parts in position for fluid passage.

Fig. 3 is an enlarged sectional view illustrating the parts with the seal means closed against fluid passage.

Fig. 4 is a fragmentary view in section and greatly enlarged to better illustrate the feature of the centrifugally operated valve.

Referring particularly to the drawing 10 illustrates a part of the engine casing, forwardly from which projects an engine driven shaft 12 drivingly supporting a propeller having blades secured in sockets 14 provided by a hub having a rearward extension 16 driven through the agency of splines 18 and seated against a rear cone 20. Mounted on the hub for instance concentric with the hub sleeve 16 there is a regulator housing comprising a plate 22 to which is affixed a cover member 24. The plate 22 is annular in form such that its inner periphery 28 closely embraces the cylindrical portion 16 of the sleeve where it is maintained by means of a sleeve nut 30 threaded onto the sleeve 16 at 32, the forward end of the sleeve nut 30 forcing the plate 22 against the radiating socket portions 14.

The cover member 24 telescopically engages over the rim 34 of the plate 22 where it is held in sealed relation by means of screw devices 36. For closing the inner boundary of the reservoir that is provided by the members 22 and 24, an adapter assembly is provided that makes use of a tubular extension 38 surrounding the sleeve nut 30 loosely and extending across the space between the plate 22 and the parallel wall 40 of the cover 24. The inner boundaries of both the members 22 and 40 are circumferentially recessed to receive bearing members 42 and 44 respectively that are interposed between their respective supporting members and the tubular extension 38, thus completing the enclosure as a reservoir that may be charged with a predetermined amount of operating fluid. That is, an annular or ring like chamber is supported by the propeller hub, and surrounds the drive shaft and hub sleeve. It is provided by the plate member 22, the cover 24, the bearing member 42, 44 and the tubular extension 38. Within the reservoir so constituted, there is provided regulating and control mechanism that embraces a pump 46, a governor mechanism 48, and perhaps relief valves, breather valves and the like, each and all operating on or by reason of the fluid medium contained within the reservoir.

The tubular extension 38 forms part of an adapter assembly as has been stated, and also forms a support for adjusting and operating mechanism by which manual control is effected for the elements enclosed within the reservoir, and by which power is applied to the fluid circulating means 46. Directed toward support of the adjusting mechanism the sleeve 38 is provided with circumferentially aligned flange portions 50 disposed to be adjacent the bearing member 42, and spaced axially thereof is provided a tooth flange 52. These flanges 50 and 52 provide stops for axial movement of a control ring 54 embracing the intervening portion of the sleeve 38. The inner periphery of the control ring 54 is appropriately notched such that the ring may be telescopically passed over the flange portions 50 and thence it may be turned or rotated to bring about the relation existent in Fig. 3. In order to gain the full extent of possible movement between the stops 50 and 52 one end face of the control ring is arcuately notched as at 56 to receive the flange portions 50 at one extreme of movement. To keep the control ring 54 in proper alignment dowel pins 58 secured in a thickened flange 60 of the sleeve 38 extend across the space between the stop flanges and engage bores 62 so that the control ring in moving axially of the sleeve 38 may be guided by the dowel 58 as it slides over it. In the outer periphery of the control ring 54 there is a groove 64 adapted to receive a shoe member 66 of a slide block 68 movable upon guides 70 and carrying a fulcrum roller 72. The fulcrum roller 72 supports one end of a lever 74 biased by a spring 76 for movement of the governor valve forming a part of the mechanism 48. Movement of the control ring 54 thus carries the slider 68 along the guides 70 and in doing so either lengthens or shortens the moment arm of the lever 74 between the fulcrum 72 and the line of spring force 76 and in that way alters the effect of the control mechanism 48.

As a means for moving the control ring 54 along the sleeve 38 and between the limits afforded by the stop flanges 50 and 52, a plurality of shafts 80 are provided that have threaded portions 82 received by complementary threaded portions of the ring 54. The shafts 80 are likewise received by enlarged bores 84 through the flange 52 and thickened portion 60 of the sleeve 38 but are of sufficiently greater diameter than the shafts 80 as to provide a substantial clearance whereby possible weave and gyration of the shafts may be permissible.

The screw shafts 80 have a journal bearing 86 in a ring 88 aligned with and held in end to end engagement with the sleeve 38 by means of the dowels 58, the ring 88 having sockets 90 for that purpose. The ring 88 is counterbored at 91 about the shaft 80 and in line with the journal bearing 86, for reception of a fluid seal 94 backed up by a washer 96 and a spring 98 seated against a ring 100.

For operating the screw shafts 80 there is provided a pinion 102 on the end of each shaft where it projects through the journal bearing 86. Mounted to slide circumferentially about the ring 88 there is a ring gear 104 that meshes with the pinion 102, an arm 106 adapting the ring for either automatic or manual operation as may be desired. Acting as a keeper and a thrust member for the ring and pinion there is a flanged ring 108 that provides a backing for screw devices 110 passing through the ring 108, the ring 88 and threading into the thickened portion 60 of the sleeve 38. When these parts are thus assembled and secured by the screw device 110 the adapter assembly is complete, and the reservoir with hub attached is ready for mounting upon the engine shaft 12 as a single unit of assembly.

In assembling the propeller with its regulator mechanism the hub sleeve 16 is passed over the shaft 12 with the splines 18 in registry. As the assembly nears the seating position between the rear cone 20 and the rearward incline of the hub sleeve 16 the adapter assembly is rotated with respect to the engine casing 10 until a notch portion 112 of the ring 108 is in receptive relation with a lug 114 of a composition plate 116 secured against the cover plate 118 of the engine casing 10 by means of screw devices 120. Thence the propeller hub and regulator assembly is forced into seating relation and the shaft nut applied to retain the parts in assembled relation. Under those conditions of assembly the adapter assembly will be relatively fixed against rotation relative to the engine casing in consequence of which the reservoir or rather the housing members comprising it will rotate about the sleeve portion 38. The manner of retaining the adapter assembly against rotation, but not firmly attaching it to the engine casing permits the sleeve portion 38 to always continue in a condition of concentricity with respect to the bearing members 42 and 44 of the reservoir housing. Thus if the bearing surfaces of the members 42 and 44 are not exactly concentric with the shaft 12, it is possible for the sleeve 38 to weave with respect to it in following the concentricity of the bearing members.

Directed toward application of power for driving the pump 46 the stop flange 52 is provided with gear teeth 122 that mesh with the teeth 124 of a pump driving gear 126. The pump 46 is wholly contained within the reservoir and has an inlet 128 so that it may withdraw medium from the reservoir and deliver it to a pressure supply line 130 which leads to control passages of the governor mechanism 48 from which it is selectively delivered to one or more passages 132 but all of which is unnecessary of description here inasmuch as it forms no part of this invention and is elsewhere described in companion cases. It should however be observed that rotation of the propeller carries with it the regulator housing and causes the parts 22 and 24 of the associated bearings 42 and 44 to rotate about the sleeve 38.

When the reservoir is conditioned for automatic control of the selected devices, it is nearly filled with a fluid medium. Under a condition of rest this fluid medium would be likely to seep out from between the inner periphery of the bearing members 42 and 44 and the engaged portions of the sleeve 38. Though care in manufacturing may result in such close fit of those parts as to preclude any substantial amount of leakage, operation of the mechanism might so iron out or score the fit as to increase the clearances between the parts, following which leakage might occur. It will be recalled that under a state of rotation, the fluid medium nearly filling the reservoir will in consequence of centrifugal forces acting upon the medium be centrifuged to the perimetric wall 24 of the reservoir, leaving a radial and inwardly disposed annular void or air space between the inner surface of the medium and the sleeve 38. At normal filling of the reservoir that void or annular space would extend from the sleeve 38 radially outward beyond the outer perimeter of the bearing members 42 and 44. Therefore under those conditions there would be no leakage between the bearing surfaces of the sleeve 38 and the members 42 and 44 during rotation. However, as the aircraft gains or loses altitude it is desirable that the air pressure within and without the reservoir be equalized, so that upon secession of rotation there will not be loss of the fluid medium by reason of a greater internal pressure. Thus centrifugally operated valve means are provided in association with the bearings 42 and 44, so that the housing forming a reservoir may be substantially sealed against fluid flow through the bearings while the apparatus is at rest, and such that, when a condition of rotation is accomplished that will remove the fluid medium from contact with the sleeve 38, then free fluid flow between the interior and exterior of the casing will be accomplished.

Therefore, in mounting the bearings 42 and 44 the respective supporting members, that is the plate 22 and cover 24, are peripherally grooved at 134 and 136 respectively for reception of the corresponding bearing members. Aside from the difference in over-all dimension the bearing members 42 and 44 are substantially alike such that a description for one will suffice for the other. Thus, the bearing member 42 has its inner diameter 138 providing a bearing surface engaging the outer surface of the sleeve 38 while its outer periphery closely fits against the peripheral wall of the groove 134, an outwardly extending flange 140 being receptive of cap screws 142 threaded into the body of the plate 22, for securing the bearing in place. That portion of the bearing ring projecting axially into the groove 134 is successively stepped at 142, 144 and 146 while the edge is chamfered off at 148 to provide an outward overhang. The stepping of the bearing member provides an annular recess 147, which may be called a valve chamber, and is substantially enclosed by a portion of the sleeve 38, the bearing member and the supporting plate for the reception of a centrifugally operated valve 150.

The details of the centrifugally operated valve 150 are shown in the enlarged views Figs. 2, 3 and 4 where a resilient ring 152 of rubber or rubber like material is bonded to a backing member 154 and disposed in the peripheral groove 134 or 136 to substantially fill the annular recess or valve chamber above referred to. The resilient ring preferably is of the contour illustrated and is molded in such form that its unstressed contour will be substantially as indicated in Fig. 2. Specifically the resilient ring 152 may be said to comprise a pair of concentric rings including an inner ring portion 156 and an outer ring portion 158 joined by an integrally connected web portion 160. The outermost ring portion 158 is chamfered at one edge 162 to mate with the chamfered edge 149 of the associated bearing members. The opposite end of the ring portion 158 and the connecting web 160 along with one end of the ring portion 156 in the normal unstressed condition of the pivot ring lie within a single plane. The backing member 154 comprises a rigid metal annulus extending from the outer periphery of the resilient ring inwardly for about two thirds of the radial dimension of the resilient ring such as to leave the inward portion 164 of the web where it is joined to the innermost ring 156 free for a certain amount of flexing. At the opposite end of the innermost ring 156 from that joined to the web 160 there is an outwardly extending circumferential flange 166 having its juncture 168 somewhat thickened so as to add an additional mass to the normally free end of the ring 156, and so as to form a wedge shape groove 170 between the flange 166 and the web 160. In the free or unstressed condition of the resilient ring the outward edge of the flange 166 may engage the step 144 of the bearing such as to provide a stop or abutment against outward distortion of the flexing portion of the valve member. Disposed within the groove 170 there is a garter spring 172 so stressed as to normally engage the approximate sides of the web 160 and flange 166 thereby causing the engaged members to spread substantially as indicated in Fig. 3. That spreading will cause the resilient member to flex and bend at the juncture of the web 160 and ring 156 somewhat as indicated in full lines in Fig. 4, and will bring the edge 174 of the inner ring into continuous embracing relation with the adjacent portion of the adapter assembly. Thus normally, under stress of the garter spring 172, the inner ring portion will engage the cylindrical surface of the adapter assembly and prevent fluid flow between the adapter assembly and the resilient ring. In other words a seal is effected.

So that the innermost ring 156 may disengage the adapter assembly when a predetermined speed of rotation has been accomplished, weight members consisting of steel balls 176 or the like are lodged within the confines of the garter spring 172 which respond to the speed of rotation to stretch the garter spring so that it may be moved outwardly of the groove 170. It may in fact move outwardly so far as to engage the step 146 of the bearing member which acts as a stop therefor. As the garter spring stretches and moves radially outward, centrifugal force acting upon the flange 166 of the resilient ring combined with the inherent resiliency of the ring between the edge of the backing member 154 and the attachment to the flange causes the edge portion 174 to disengage the adapter assembly so that fluid flow will be established between the members.

Communication is afforded between the valve chamber 147 and the interior of the reservoir by means of bores or drill-ways 178 extending from the bottom of the step 142 diagonally and radially outward of the center of rotation as most clearly shown in Figs. 2 and 3, these drill-ways principally operating as drain passages between the valve chambers 147 and the reservoir. Disposed in the peripheral groove afforded by the step 142 of each bearing there may be lodged a fibrous ring 180 such as felt or the like which tends to arrest fluid flow outward through the passage 178 into the valve chamber 147.

While the embodiment of the present invention as herein disclosed, constitutes a preferred form, it is to be understood that other forms might be adopted, all coming within the scope of the claims which follow.

What is claimed is as follows:

1. In an apparatus of the class described, an operating shaft for driving a propeller, support means for the shaft, an adapter assembly shiftably surrounding the shaft but fixed against rotation with respect to the support means, a reservoir rotatable with the propeller and having a closing wall provided by the adapter assembly, bearing means and fluid seals carried by the reservoir and engageable in running contact with the adapter assembly and means adapted upon reservoir rotation at a predetermined speed to permit the seals to lift away from said adapter assembly under the urge of centrifugal force.

2. In an apparatus of the class described, an operating shaft for driving a propeller, support means for the shaft, an adapter assembly surrounding the shaft and fixed against rotation but oscillatable with respect to the support means, a reservoir rotatable with the propeller and comprising parallel wall members joined by a circumferential wall member, said adapter assembly maintained against rotation by the supporting means and projecting into the reservoir for closing the same, bearing means interposed between the adapter and the parallel wall members, and centrifugally operated valve means carried by the parallel wall members slidably engageable with the adapter at rest and for speeds of rotation below a predetermined value, but adapted to lift out of contacting engagement for speeds greater than the predetermined speed of rotation.

3. The combination set forth in claim 2, wherein the bearing members are provided with drain holes leading from the outer sides of the bearing members back to the reservoir.

4. A propeller control mechanism of the character described, a substantially annular shaped member mounted adjacent and rotatable with the propeller hub, an outer annular housing engaging said annular member, both of said annular members having their inner peripheries entirely open and unobstructed and being receivable over the propeller shaft, an adapter assembly fixed against rotation and projecting through the central opening of the annular members to form a reservoir, bearing members mounted in the inner peripheries of said annular members and having a running fit on the adapter assembly, resilient flanged rings outwardly of the bearings as respects the reservoir, and contractile spring means urging a flange of each ring into engagement with the adapter assembly, and means for loading the springs and responsive to a predetermined speed of propeller rotation to permit lifting of the flanges from the adapter assembly.

5. In a regulator for an aircraft propeller, the combination comprising, a reservoir mounted for rotation with the propeller, an adapter assembly comprising a tubular extension projecting into the reservoir, bearing means between the adapter extension and reservoir, centrifugally operated valve means for control of fluid flow out of the reservoir and comprising an annulus having a resilient flange adapted to engage the tubular extension during speed below a predetermined rate of rotation, but responsive to centrifugal forces at speeds greater than the predetermined rate of rotation to disengage the tubular extension so that fluid flow may then occure into and out of said reservoir, and means maintaining the adapter assembly and the housing in relatively rotatable relation, comprising a part on the engine housing preventing rotation of the adapter assembly with respect thereto.

6. A centrifugally operated valve adapted to open and stop fluid passage into and out of a chamber formed by a fixed and a rotatable part, said valve comprising in combination an annulus of resilient material having concentric inner and outer ring portions joined by a radially extending web, said inner ring portion having an outwardly extending materially thickened flange divergingly spaced from said web, a rigid backing member secured to the outer ring portion and adjacent portion of the joining web and adapted for mounting the annulus on the rotatable member, spring means under tension encompassing the annulus and adapted to engage the proximate surface of the web and thickened flange, whereby the spreading of the diverging portions causes such bending of the annulus at the juncture of the web and inner ring portion that the inner ring portion is pressed into continuous contacting relation with the fixed part whereby fluid flow therethrough is interrupted, and a centrifugally operated mass acting upon said spring means to relieve the spread of the web and flange of the annulus at a predetermined speed of rotation, whereby the inner ring of said annulus may lift off the fixed part in response to centrifugal force applied to the thickened flange to permit fluid flow therethrough.

7. A propeller control mechanism of the character described for use with an hydraulically adjustable propeller having provision for effecting adjustment of the pitch of the propeller blades upon the application of fluid pressure thereto, comprising a propeller hub, a housing rotatable with said propeller hub, a relatively stationary member projecting into said housing, means for establishing a fluid seal between said housing and said stationary member providing a reservoir within said housing for receiving a quantity of fluid pressure medium, said seal means comprising an annulus of resilient material carried by the housing and having a portion adapted to engage and disengage the stationary member, yielding means acting upon said portion and tending to press it into engagement with the stationary member, but responding to a predetermined speed of rotation to relieve said pressure whereby said annulus disengages the stationary part while the speed of rotation is greater than said predetermined speed of rotation.

8. A relatively fixed part, a part rotatable relative thereto, and providing an annular groove radially spaced from the fixed part, bearing means secured in the groove and adapted to ride upon the fixed part, an annulus surrounding the fixed part and secured to the rotatable part between the fixed part and said bearing means by a fluid tight connection, said annulus comprising a pair of concentric rings radially spaced and connected by an integrally joined web, the innermost ring being resilient and having a circumscribing flange of relatively large mass divergingly spaced relative to the web, and responsive to centrifugal force for flexing the resilient ring in response to a predetermined speed of rotation, means including the bearing means for securing the annulus in the rotatable part, and a garter spring normally engaging the flange and web for opposing the centrifugal force for camming the resilient ring in engagement with the fixed part for all speeds of rotation less than the predetermined speed of rotation.

9. A relatively fixed part, a part rotatable relative thereto, an annulus surrounding the fixed part and secured to the rotatable part by a fluid tight connection, said annulus comprising a pair of concentric rings radially spaced and connected by an integrally joined web, the innermost ring being resilient and having an oblique faced flange of relatively large mass divergingly spaced from the web and responsive to centrifugal force for flexing the resilient ring in response to a predetermined speed of rotation, a rigid ring secured to the web of said annulus for localizing the flexure of said resilient ring and a garter spring normally engaging the oblique face of the flange and the web for wedging the flange in contact with the fixed part in opposing the centrifugal force for all speeds of rotation less than the predetermined speed of rotation.

10. In a regulator for an aircraft propeller, the combination comprising, a reservoir mounted for rotation with the propeller, an adapter assembly comprising a tubular extension projecting into the reservoir, bearing means between the adapter extension and reservoir, centrifugally operated valve means for control of fluid flow out of the reservoir and comprising an annulus having a resilient flange adapted to engage the tubular extension during speed below a predetermined rate of rotation, but responsive to centrifugal forces at speeds greater than the predetermined rate of rotation to disengage the tubular extension so that fluid flow may then occur into and out of said reservoir.

11. A relatively fixed part, a part rotatable relative thereto, bearing means interposed radially between the fixed part and the rotatable part and secured to one of the parts, an annulus surrounding the fixed part and secured to the rotatable part by the bearing means in a fluid tight connection, said annulus comprising a pair of concentric rings radially spaced and connected by an integrally joined web, the innermost ring being resilient and having a circumscribing flange of relatively large mass responsive to centrifugal force for flexing the resilient ring in response to a predetermined speed of rotation, and a garter spring normally engaging the flange and opposing the centrifugal force for maintaining the resilient ring in engagement with the fixed part for all speeds of rotation less than the predetermined speed of rotation.

12. A relatively fixed part, a part rotatable relative thereto, and providing an annular groove radially spaced from the fixed part, bearing means secured in the groove and adapted to ride upon the fixed part, an annulus surrounding the fixed part and secured to the rotatable part between it and said bearing means by a fluid tight connection, said annulus comprising a pair of concentric rings radially spaced and connected by an integrally joined web, the innermost ring being resilient and providing a radially extending flange of relatively large mass responsive to centrifugal force for flexing the resilient ring in response to a predetermined speed of rotation, a rigid ring adjoining the web of the annulus for localizing the flexure of said resilient ring, and a garter spring under tension normally engaging the flange of the innermost portion of the ring for opposing the centrifugal force to maintain the resilient ring in engagement with the fixed part for all speeds of rotation less than the predetermined speed of rotation.

13. A relatively fixed part, a part rotatable relative thereto, and providing an annular groove radially spaced from the fixed part, bearing means secured in the groove and adapted to ride upon the fixed part, an annulus surrounding the fixed part and secured to the rotatable part by a fluid tight connection, said annulus comprising a pair of concentric rings radially spaced and connected by an integrally joined web, the innermost ring being resilient and having a circumscribing flange of relatively large mass responsive to centrifugal force for flexing the resilient ring in response to a predetermined speed of rotation, means including the bearing operating to secure the annulus within the annular groove of the rotatable part and a stop ledge provided by the bearing means for the flange of the annulus when it lifts off of the fixed part, and means normally engaging the flange and opposing the centrifugal force for maintaining the resilient ring in engagement with the fixed part for all speeds of rotation less than the predetermined speed of rotation.

14. A relatively fixed part, a part rotatable relative thereto, and providing an annular groove radially spaced from the fixed part, bearing means secured in the groove and cooperating therewith to provide a valve chamber, an annulus disposed in the chamber and having a flexible part adapted to engage the fixed part, but normally responsive to a predetermined speed of rotation to retract therefrom, said bearing means providing a ledge acting as a stop for the flexible part of the annulus for limited flexing of the annulus while in the retracted position, and means also disposed within the valve chamber for flexing the flexible part of the annulus into engagement with the relatively fixed part for speeds less than the said predetermined speed of rotation.

15. A relatively fixed part, a part rotatable relative thereto, and providing an annular groove radially spaced from the fixed part, bearing means secured in the groove and cooperating therewith to provide a valve chamber, an annulus disposed in the chamber and having a flexible part adapted to engage the fixed part, but normally responsive to a predetermined speed of rotation to retract therefrom, said bearing means providing a plurality of concentric ledges exposed to said valve chamber, one of which acts as a stop for the retracted flexible part of the annulus, a fibrous ring at the juncture of the fixed part and bearing means, and lodged in another of said concentric ledges, means providing a drainback from the valve chamber comprising bores through the bearing means ending at the fibrous ring, and means urging the flexible part of said annulus into running contact with the fixed part for controlling fluid flow from the valve chamber in response to speed of rotation of the rotatable part.

16. A relatively fixed part, a part rotatable relative thereto, bearing means interposed between the fixed part and the rotatable part and secured to one of the parts, an annulus surrounding the fixed part and secured to the rotatable part by a fluid tight connection, said annulus comprising a pair of concentric rings radially spaced and connected by an integrally joined web of flexible material, the innermost ring being resilient and having a circumscribing flange of relatively large mass disposed at an acute angle with the web, and responsive to centrifugal force for flexing the resilient ring and web in response to a predetermined speed of rotation, and means engaging the flange and web and normally wedging the flange radially inward to contact the fixed part during rest of the parts and during relative rotation at speeds below the predetermined speed of rotation, said flange engaging means opposing the centrifugal force of propeller rotation but operable at speeds above the predetermined speed of rotation to relieve wedging of the flange and permit lifting of the said inner ring from the fixed part whereby wear of the annulus is eliminated.

THOMAS B. MARTIN.
KENNETH L. BERNINGER.